(12) United States Patent
Lennen (10) Patent No.: US 10,880,029 B2
(45) Date of Patent: Dec. 29, 2020

(54) SYSTEM AND METHOD FOR IMPROVED DATA DECODING, TRACKING, AND OTHER RECEIVER FUNCTIONS IN THE PRESENCE OF INTERFERENCE

(71) Applicant: Samsung Electronics Co., Ltd., Gyeonggi-do (KR)

(72) Inventor: Gary Lennen, Cupertino, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/544,406

(22) Filed: Aug. 19, 2019

(65) Prior Publication Data
US 2019/0372695 A1    Dec. 5, 2019

Related U.S. Application Data

(62) Division of application No. 15/189,760, filed on Jun. 22, 2016, now Pat. No. 10,389,464.
(Continued)

(51) Int. Cl.
*H03D 3/18* (2006.01)
*H04J 11/00* (2006.01)
(Continued)

(52) U.S. Cl.
CPC ........ *H04J 11/0023* (2013.01); *H04L 27/265* (2013.01); *H04L 27/2628* (2013.01); *H04L 43/028* (2013.01); *H04W 72/0473* (2013.01)

(58) Field of Classification Search
CPC .............. H04J 11/0023; H04L 27/2628; H04L 27/265; H04L 43/028; H04W 72/0473
(Continued)

(56) References Cited

U.S. PATENT DOCUMENTS

| | | | | |
|---|---|---|---|---|
| 5,699,045 | A | * | 12/1997 | Frederick ........... G08B 13/2471 340/551 |
| 5,742,591 | A | * | 4/1998 | Himayat ................ H04N 7/102 348/E7.052 |

(Continued)

FOREIGN PATENT DOCUMENTS

| | | |
|---|---|---|
| CN | 103954977 | 7/2014 |
| EP | 1 596 503 | 11/2005 |

(Continued)

OTHER PUBLICATIONS

Hongwei et al., Interference suppression in gnss receiver using space-time adaptive processing, 2011 IEEE 3rd International Conference on Communication Software and Networks (ICCSN), May 27, 2011.

(Continued)

*Primary Examiner* — Zewdu A Kassa
(74) *Attorney, Agent, or Firm* — The Farrell Law Firm, P.C.

(57) ABSTRACT

An apparatus and a method. The apparatus includes an interference mitigation processor, including an input, and an output, the interference mitigation processor configured to sum n msec received correlators over m msec, and analyze the n msec correlators to reduce interference. The method includes summing, by an interference mitigation processor, n msec received correlators over m msec; and analyzing, by an interference mitigation processor, the n msec correlators to reduce interference.

16 Claims, 7 Drawing Sheets

Related U.S. Application Data (60) Provisional application No. 62/328,752, filed on Apr. 28, 2016.

(51) Int. Cl.
  *H04L 27/26* (2006.01)
  *H04L 12/26* (2006.01)
  *H04W 72/04* (2009.01)

(58) Field of Classification Search
  USPC .................................. 375/328, 316, 219, 295
  See application file for complete search history.

(56) References Cited

U.S. PATENT DOCUMENTS

| | | |
|---|---|---|
| 6,327,298 B1 | 12/2001 | Grobert |
| 6,816,539 B1 | 11/2004 | Rog |
| 7,605,753 B2 | 10/2009 | Landmark |
| 8,072,376 B2 | 12/2011 | Lennen |
| 8,184,676 B2 | 5/2012 | Lennen |
| 8,896,479 B2 | 11/2014 | Wang et al. |
| 9,094,275 B1 * | 7/2015 | Papadimitriou .... H04L 27/2688 |
| 2011/0007852 A1 * | 1/2011 | Kimata ................ H04B 7/0854 |
| | | 375/341 |
| 2012/0027141 A1 * | 2/2012 | Petrovic ............. H04B 7/18513 |
| | | 375/350 |
| 2013/0154880 A1 | 6/2013 | Dickman et al. |

FOREIGN PATENT DOCUMENTS

| | | |
|---|---|---|
| FR | 2 984 524 | 6/2013 |
| WO | WO 2009/002936 | 12/2008 |

OTHER PUBLICATIONS

Axelrad et al., Snr-based multipath error correction for gps differential phase, IEEE Transactions on Aerospace and Electronic Systems, Apr. 1, 1996 (vol. 32, Issue 2).

\* cited by examiner

SYSTEM AND METHOD FOR IMPROVED DATA DECODING, TRACKING, AND OTHER RECEIVER FUNCTIONS IN THE PRESENCE OF INTERFERENCE

PRIORITY

This application is a Divisional application of U.S. patent application Ser. No. 15/189,760 filed on Jun. 22, 2016 in the United States Patent and Trademark Office and scheduled to issue on Aug. 20, 2019, and claims priority under 35 U.S.C. § 119(e) to U.S. Provisional Patent Application Ser. No. 62/328,752, filed on Apr. 28, 2016 in the United States Patent and Trademark Office, the entire contents of which are incorporated herein by reference.

FIELD

The present disclosure relates generally to an apparatus and a method for improving data decoding and tracking, and more particularly, to an apparatus and method for improving data decoding and tracking post correlation.

BACKGROUND

A global navigation satellite system (GNSS) receiver, using the global positioning system (GPS), globalnaya navigazionnaya sputnikovaya sistema (GLONASS), European GNSS known as Galileo, or Beidou navigation satellite system, may be used in many applications. The GNSS receiver is an electronic device that may be implemented in various devices such as a mobile device (e.g., a cell phone, a tablet computer) and a vehicle (e.g., a car, a motorcycle). The GNSS receiver receives and digitally processes signals received from a GNSS satellite constellation to provide position, velocity, and time of the receiver.

SUMMARY

According to one embodiment, an apparatus includes an interference mitigation processor, including an input, an output, and configured to sum n msec received correlators over m msec, and analyze the n msec correlators to reduce interference.

According to one embodiment, a method includes summing, by an interference mitigation processor, n msec received correlators over m msec; and analyzing, by an interference mitigation processor, the n msec correlators to reduce interference.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

The present disclose discloses an apparatus and method for improving data decoding and tracking post correlation (e.g., in a GNSS receiver). The present disclosure may improve all post correlation functions, such as data decoding and tracking, acquisition of satellites and quality of measurements made from these satellites (range and range rate for example). The post correlation signal is usually the only way that a satellite is effectively observed by a GNSS receiver (in other words it is the only observation path).

In GPS, for example, in-phase (I) and quadrature phase (Q) correlators are typically summed over 20 milliseconds (msec), using an integrate and dump (I&D) method, and the resulting values (e.g., $I_{\Sigma 20\ msec}$, $Q_{\Sigma 20\ msec}$) are used as inputs to a data decoding and tracking apparatus or method.

In the presence of Gaussian noise, an I&D operation across 20 msec optimizes the available signal-to-noise ratio (SNR) for a subsequent operation.

The n msec correlations are analyzed for different types of interference, including continuous wave (CW), non-CW wider-bandwidth interference, and pulsed jammers. The present disclosure also reduces cross-correlation interference (e.g., between satellites) and applies to on-frequency and frequency bin offset signals (e.g., satellite signals).

The present disclosure may be applied to acquisition/verify stages of a receiver and improvement of measurement quality.

According to one embodiment, the present disclosure improves data decoding, tracking, and other receiver functions that use correlation outputs for a receiver (e.g., a GNSS receiver). The present disclosure may apply one or more methods post correlation to mitigate the impact of CW and pulsed interference on signals (e.g., GNSS signals). Accordingly, data decoding, tracking, and measurement are improved, which results in improved navigation.

The present disclosure may be based on the fact that the I&D operation is not necessarily optimal in the presence of Gaussian noise and interference (including pulsed interference and cross-correlation interference). According to one embodiment, the present disclosure operates on n msec (e.g., 1 msec) correlation values (e.g., $I_{\Sigma 1\ msec}$, $Q_{\Sigma 1\ msec}$), that represent the point of maximum interference spreading by a coarse acquisition (C/A) code (e.g., which repeats every 1 msec). Based on the n msec correlations, interference may fall within the range ±500 Hz. In one embodiment, the present disclosure improves the effective filtering of a ±500 Hz limited interference range over an I&D operation. It is appreciated that other coherent time periods (e.g., 2 msec, 4 msec, and 5 msec) may be used to slow down subsequent processes, without deviating from the scope of the present disclosure.

For a data decoding process, time delay in general may not be an issue, for example, a delay of one second while processing the data bits for improved interference resistance may be a reasonable trade-off. However, in a dynamic environment, tracking loops (e.g., that uses 20 msec I and Q coherent summations) may lead to poor performing loops in a dynamic environment if they are delayed for more than 20-30 msec.

In the present disclosure, interference is mitigated via post correlation interference mitigation methods, and the present disclosure may switch to an antenna that minimizes interference. In addition, post correlation combinations of multiple antennas may be used to mitigate interference, where replicas of sine, cosine vs. correlation time delay may be created in the time or frequency domain and subtracted from incoming correlations.

According to one embodiment, the present disclosure may apply interference mitigation post correlation using one or more of (1) a filter method; (2) a filter with a summation method (e.g., an I&D method); (3) a fast Fourier transform/inverse fast Fourier transform (FFT/IFFT) method; and (4) a pulse removal and tone cancellation method. The present disclosure may determine one or more of the above methods for interference mitigation post correlation based on a predetermined time delay. For example, for a tracking method and a data decoding method, the present disclosure may use a different method to generate n msec I and Q values (e.g., 20 msec I and Q values). In addition, the present disclosure may reduce cross-correlation interference between signals (e.g., satellites signals).

Figure 1:
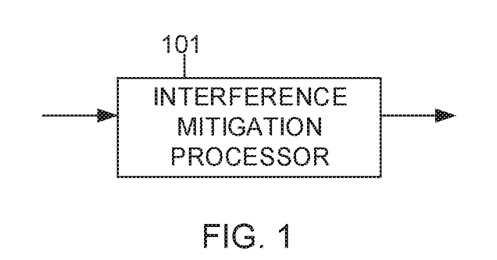
FIG. 1 is a block diagram of an interference mitigation processor, according to an embodiment of the present disclosure.

FIG. 1 is a block diagram of an interference mitigation processor 101, according to an embodiment of the present disclosure.

Referring to FIG. 1, the interference mitigation processor 101 is configured to reduce interference post correlation.

Figure 2:
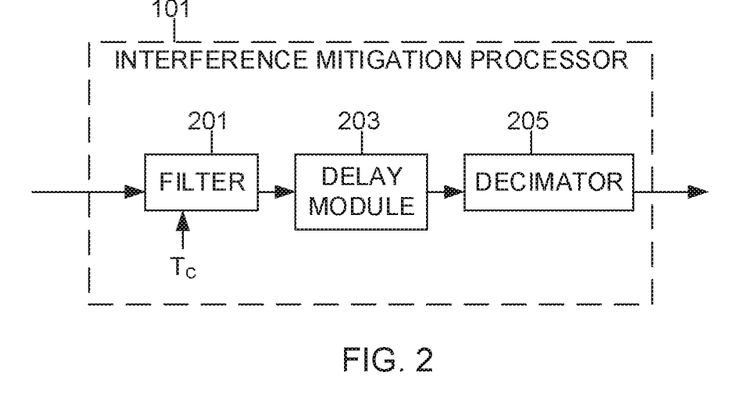
FIG. 2 is a block diagram of the interference mitigation processor of FIG. 1, according to an embodiment of the present disclosure.

FIG. 2 is a block diagram of the interference mitigation processor 101 of FIG. 1, according to an embodiment of the present disclosure, where the interference mitigation processor 101 uses a filter method.

Referring to FIG. 2, the interference mitigation processor 101 includes a filter 201, a delay module 203, and a decimator 205.

The filter 201, includes a first input for receiving coherent correlation values (e.g., I and Q correlators), a second input for receiving a sampling time ($T_C$), and an output for providing filtered correlation values for the sampling time $T_C$. For example, if 1 msec coherent correlation signals are received, $T_C$ is 1 msec, and the filter 201 provides 1 msec of filtered coherent summations. The filter 201 may be a finite impulse response (FIR) filter. It is appreciated that other types of filters, such as an infinite impulse response (IIR) filter, may be used without deviating from the scope of the present disclosure. The filter 201 may have a delay equal to half the length of the filter 201.

The delay module 203 includes an input connected to the output of the filter 201, and an output. The delay module delays the output of the filter 201 by m msec.

The decimator 205 includes an input connected to the output of the delay module 203, and an output. The decimator 205 reduces the sampling rate of the output of the delay module 203. For example, if coherent correlators optimal for noise are desired (e.g., $I_{\Sigma 20\ msec}$, $Q_{\Sigma 20\ msec}$ signals), every $20^{th}$ filter 201 output may be selected to align with a 20 msec data bit, where the resulting $I_{\Sigma 20\ msec}$, $Q_{\Sigma 20\ msec}$ signals have a delay of approximately half the length of the filter 201 (e.g., about 30 msec) so that these values may be used for data decoding and/or used as inputs to code and carrier tracking methods.

Figure 3:
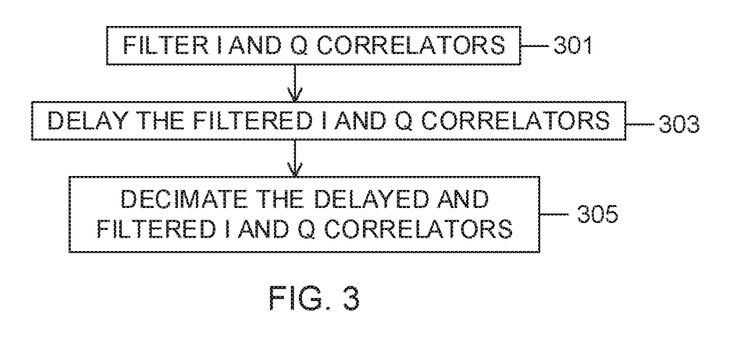
FIG. 3 is a method of the interference mitigation processor of FIG. 2, according to an embodiment of the present disclosure.

FIG. 3 is a method of the interference mitigation processor 101 of FIG. 2, according to an embodiment of the present disclosure, where the interference mitigation processor 101 uses a filter method.

Referring to FIG. 3, the method filters, by a filter, coherent correlators at a sampling time $T_C$ at 301. The coherent correlators may be I and Q correlators sampled at a rate of 1 msec (e.g., $I_{\Sigma 1\ msec}$, $Q_{\Sigma 1\ msec}$ signals). However, other coherent times for and the correlators may be 2 msec, 4 msec, 5 msec, etc. The coherent correlators may be filtered by a FIR filter, an IIR filter, or any other suitable filter.

At 303, the filtered correlators are delayed m msec, by a delay module, where m may be half the length of the filter 201.

At 305, the delayed filtered coherent correlators are decimated, by a decimator, to provide the coherent correlators at a reduced sampling rate. The decimation rate may be optimal for noise (e.g., 20 msec) to produce coherent correlators $I_{\Sigma 20\ msec}$, $Q_{\Sigma 20\ msec}$. The delay is introduced such that the 20 msec integration period straddles exactly the data bit period of the satellite (e.g., 20 msec for GPS). However, the present disclosure is not limited to using 20 msec, and other periods may be used.

Figure 4:
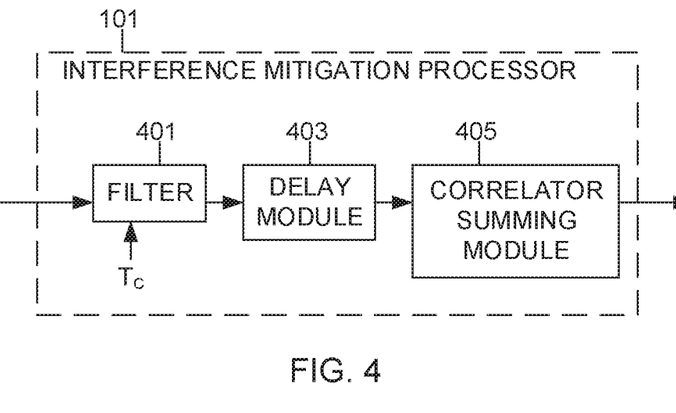
FIG. 4 is a block diagram of the interference mitigation processor of FIG. 1, according to an embodiment of the present disclosure.

FIG. 4 is a block diagram of the interference mitigation processor 101 of FIG. 1, according to an embodiment of the present disclosure, where the interference mitigation processor 101 uses a filter and summation method (e.g., an I&D summation method).

Referring to FIG. 4, the interference mitigation processor 101 includes a filter 401, a delay module 403, and a correlator summing module 405.

The filter 401, includes a first input for receiving coherent correlation values (e.g., I and Q correlators), a second input for receiving a sampling time ($T_C$), and an output for providing filtered coherent correlation values for a time $T_C$. For example, if the received coherent correlation values are $I_{\Sigma 1\ msec}$, $Q_{\Sigma 1\ msec}$, $T_C$ is 1 msec, and the filter 401 provides 1 msec of filtered coherent summations. The filter 401 may be an FIR filter, and an IIR filter, or any other suitable filter. A FIR filter may have a delay equal to half the length of the FIR filter.

The delay module 403 includes an input connected to the output of the filter 401, and an output. The delay module delays the output of the filter 401 by m msec.

The correlator summing module 405 includes an input connected to the output of the delay module 403, and an output. The correlator summing module 405 sums the delayed and filtered correlators. The correlator summing module 405 may use an I&D method optimized for noise (e.g., a 20 msec I&D method). However, the present disclosure is not limited thereto, and any suitable summing method may be used.

Using filtering with I&D, the present disclosure reduces no-interference bit error rate (BER) losses by performing a wider filtering followed by an I&D method (e.g., a 20 msec I&D method, which is optimal for noise). The wider the bandwidth of the filter 401, the less the no-interference BER loss, where the filter 401 may have a fraction of a decibel (dB) loss as compared to an optimal no-interference 20 msec I&D method.

Figure 5:
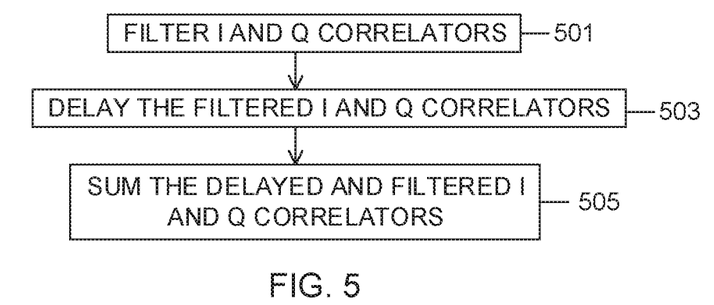
FIG. 5 is a method of the interference mitigation processor of FIG. 4, according to an embodiment of the present disclosure.

FIG. 5 is a method of the interference mitigation processor 101 of FIG. 4, according to an embodiment of the present disclosure, where the interference mitigation processor 101 uses a filter and summation method (e.g., an I&D summation method).

Referring to FIG. 5, the method filters, in a filter, coherent correlators (e.g., I and Q correlators) at a sampling time $T_C$ at 501. If the coherent correlators are $I_{\Sigma 1\ msec}$, $Q_{\Sigma 1\ msec}$, $T_C$ is 1 msec. The coherent correlators and $T_C$ may be other times such as 2 msec, 4 msec, 5 msec, etc. The coherent correlators may be filtered by a FIR filter, an IIR filter, or any other suitable filter.

At 503, the filtered correlators are delayed m msec, by a delay module. The delay aligns the sum process at step 505 to be substantially aligned with a satellite's data bit (e.g. 20 msecs in the case of GPS). For example, m may be half the length of the filter 501.

At 505, the delayed filtered coherent correlators are summed, by a correlator summing module, to provide the coherent correlators at a reduced sample rate. The summation may use an I&D method optimal for noise (e.g., a 20 msec I&D method to produce $I_{\Sigma 20\ msec}$, $Q_{\Sigma 20\ msec}$). However, the present disclosure is not limited thereto, and any suitable summing method may be used.

Figure 6:
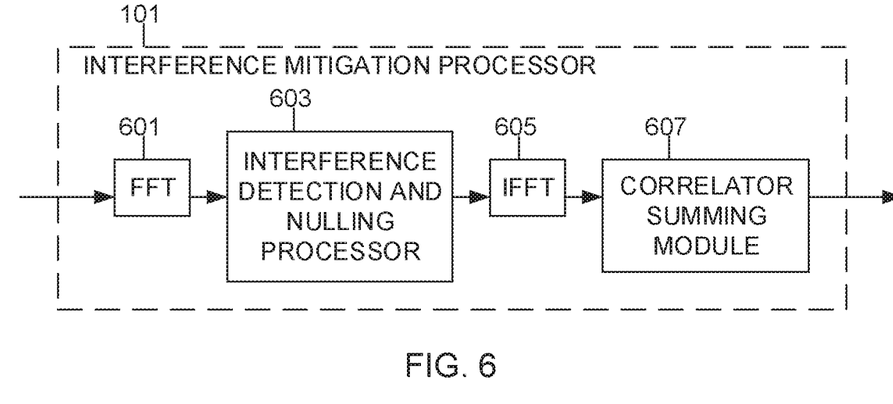
FIG. 6 is a block diagram of the interference mitigation processor of FIG. 1, according to an embodiment of the present disclosure.

FIG. 6 is a block diagram of the interference mitigation processor 101 of FIG. 1, according to an embodiment of the present disclosure, where the interference mitigation processor 101 uses an FFT/IFFT method. The FFT/IFFT method mitigates interference in band (within a first frequency lobe of a data stream) or out of band.

Referring to FIG. 6, the interference mitigation processor 101 includes an FFT processor 601, an interference detection and nulling processor 603, an IFFT processor 605, and a correlator summing module 607.

The FFT processor 601 includes an input for receiving coherent correlation values (e.g., I and Q correlators), and an output. For example, 1 msec coherent summations (e.g., $I_{\Sigma 1\ msec}$, $Q_{\Sigma 1\ msec}$) may be received by the FFT processor 601. The FFT processor 601 may be a 4096 point FFT to represent 1 msec of data, where 4096 is a power of 2 (i.e., $4096=2^{12}$). In addition, the number of points for the FFT processor 601 need not be a power of 2. Points that are not a power of two may be used with zero padding for the FFT processor 601 and the IFFT processor 605.

The interference detection and nulling processor 603 includes an input connected to the output of the FFT processor 601, and an output. The interference detection and nulling processor 603 detects interference in the output of the FFT processor 601 and nulls frequencies associated with the detected interference.

The IFFT processor 605 includes an input connected to the output of the interference detection and nulling processor 603, and an output. The IFFT processor 605 performs the inverse of the FFT processor 601.

The correlator summing module 607 includes an input connected to the output of the IFFT processor 605, and an output. The correlator summing module 607 sums the outputs of the IFFT processor 605. The correlator summing module 607 may use an I&D method optimized for noise (e.g., a 20 msec I&D method). However, the present disclosure is not limited thereto, and any suitable summing method may be used. I&D is now considered optimal here because the interference is presumed removed, leaving only the random noise component.

The FFT processor 601 may be implemented with a windowed FFT architecture for lower order FFTs (e.g. 512 point). Longer FFTs lead to a greater probability of random data (e.g. 50 Baud data) and a more predictable frequency spectrum. If the coherent correlator signals are complex, the FFT processor 601 is a complex FFT, and the IFFT processor 605 is a complex IFFT.

Figure 7:
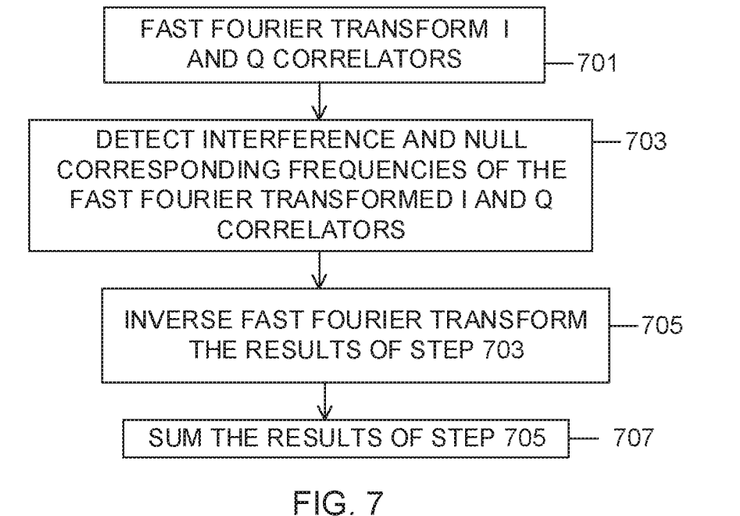
FIG. 7 is a method of the interference mitigation processor of FIG. 6, according to an embodiment of the present disclosure.

FIG. 7 is a method of the interference mitigation processor 101 of FIG. 6, according to an embodiment of the present disclosure, where the interference mitigation processor 101 uses an FFT/IFFT method.

Referring to FIG. 7, the method computes an FFT, in an FFT processor, of coherent correlators (e.g., I and Q correlators) at 701. The coherent correlators may be, for example, $I_{\Sigma 1\ msec}$, $Q_{\Sigma 1\ msec}$. The FFT may be a 4096 point FFT. However, the present disclosure is not limited thereto, and any suitable point FFT may be used.

At 703, interference in the FFT is detected and frequencies corresponding to the detected interference are nulled by an interference detection and nulling processor.

At 705, an IFFT is computed, in an IFFT processor, on the interference-nulled coherent correlators. The IFFT is computed using the same number of points used to compute the FFT at 701.

At 707, the coherent correlators resulting from the IFFT are summed by a correlator summing module. The summation may use an I&D method optimized for noise (e.g., a 20 msec I&D method) to produce coherent correlators $I_{\Sigma 20\ msec}$, $Q_{\Sigma 20\ msec}$. However, the present disclosure is not limited thereto, and any other suitable summation method may be used.

Figure 8:
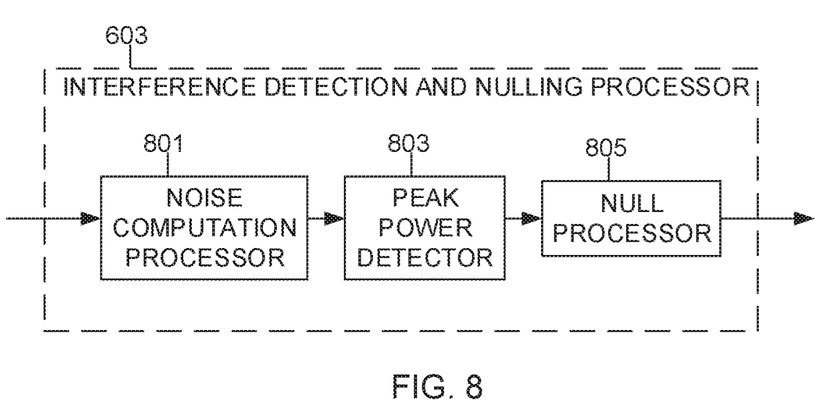
FIG. 8 is a block diagram of the interference detection and nulling processor of FIG. 6, according to an embodiment of the present disclosure.

FIG. 8 is a block diagram of the interference detection and nulling processor 603 of FIG. 6, according to an embodiment of the present disclosure.

Referring to FIG. 8, the interference detection and nulling processor 603 includes a noise computation processor 801, a peak power detector 803, and a null processor 805.

The noise computation processor 801 includes an input for receiving an FFT of received coherent correlators (e.g. an FFT of $I_{\Sigma 1\ msec}$, $Q_{\Sigma 1\ msec}$), and an output. The noise computation processor 801 computes a noise spectrum in the received coherent correlators.

The peak power detector 801 includes an input connected to the output of the noise computation processor 801, and an output. The peak power detector 803 determines the power peaks in the received coherent correlators. A power peak may be determined by comparing the power at each frequency in the received coherent correlators to a threshold, where the threshold may be the determined noise spectrum multiplied by a constant K. If the power at a frequency is greater than the noise spectrum multiplied by K, the signal at the frequency is identified as interference and a candidate for being removed from the coherent correlators by being nulled. If a potential nulling frequency is identified, a data created tone method may be used to prevent the nulling of data energy (e.g. 50 Baud data energy).

The null processor 805 includes an input connected to the output of the peak power detector 803, and an output. The null processor 805 nulls the frequencies identified as interference. In addition, a number of frequencies around an identified power peak may also be nulled (e.g., five) to remove a sufficient amount of interference energy.

Figure 9:
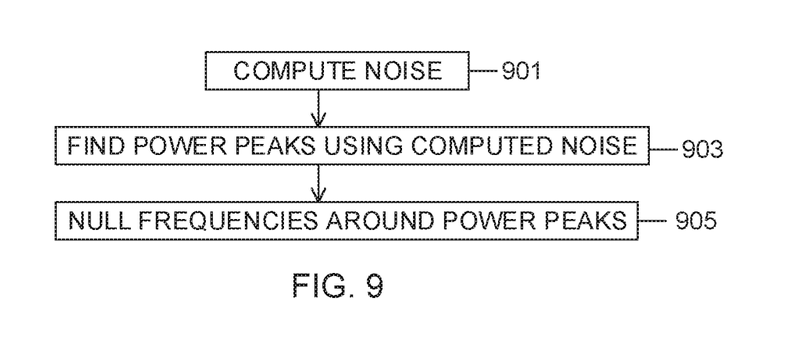
FIG. 9 is a method of the interference detection and nulling processor of FIG. 8, according to an embodiment of the present disclosure.

FIG. 9 is a method of the interference detection and nulling processor 603 of FIG. 8, according to an embodiment of the present disclosure.

Referring to FIG. 9, the method computes, by a noise computation processor, a noise spectrum in the received coherent correlators (e.g. an FFT of $I_{\Sigma 1\ msec}$, $Q_{\Sigma 1\ msec}$) at 901. The noise spectrum may be interpreted as the overall noise observed. For example, in a 4096 point FFT, a few bins may be interferers, but the majority of bins may be noise. Thus, an average of all bins may provide a good estimate of the noise average, because a few bins of interference may not influence the overall average very much. The noise spectrum may be computed by determining a mean of signal power per n msec (e.g. 1 msec) segments of all of the frequencies in the coherent correlators.

At 903, power peaks in the received coherent correlators are determined by a peak power detector. A power peak may be determined by comparing the power at each frequency in the received coherent correlators to a threshold, where the threshold may be the determined noise spectrum multiplied by a constant K. If the power at a frequency is greater than the noise spectrum multiplied by K, the signal at the frequency is identified as interference and a candidate for being removed from the coherent correlators by being nulled. If a potential nulling frequency is identified, a data created tone method may be used to prevent the nulling of data energy (e.g. 50 Baud data energy).

At 905, frequencies identified as interference are nulled by a null processor. In addition, a number of frequencies around an identified power peak may also be nulled (e.g., five) to remove a sufficient amount of interference energy.

Figure 10:
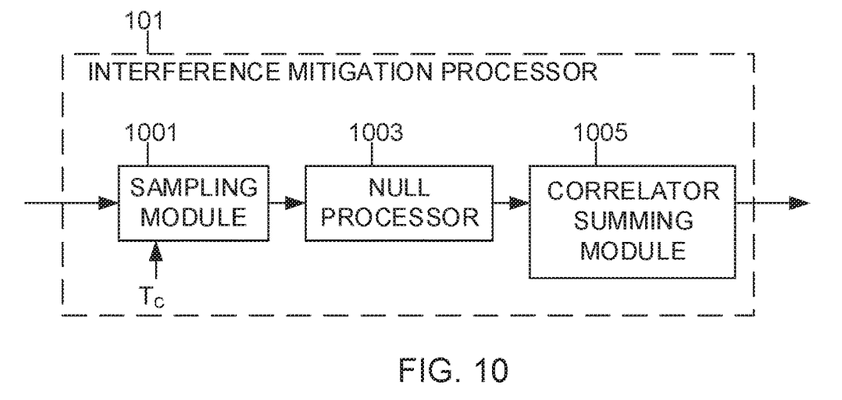
FIG. 10 is a block diagram of the interference mitigation processor of FIG. 1, according to an embodiment of the present disclosure.

FIG. 10 is a block diagram of the interference mitigation processor 101 of FIG. 1, according to an embodiment of the present disclosure, where the interference mitigation processor 101 uses a pulse method. The interference mitigation block 101 includes analyzing n msec pulses (e.g. 1 msec pulses) for excessive energy in any of the n msec I and Q correlators (e.g. 1 msec I and Q correlators).

Referring to FIG. 10, the interference mitigation processor 101 includes a sampling module 1001, a null processor 1003, and a correlator summing module 1005.

The sampling module 1001 includes a first input for receiving coherent correlation summations (e.g., 1 msec I and Q correlators $I_{\Sigma 1\ msec}$, $Q_{\Sigma 1\ msec}$), a second input for receiving a sampling time $T_C$ for sampling the received coherent correlators, and an output for providing the sampled coherent correlators. The sampling time $T_C$ is equal to the pulse width of the received coherent correlators. For example, if the pulse width of the received coherent correlators is 1 msec then $T_C$ is 1 msec.

The null processor 1003 includes an input connected to the output of the sampling module 1001, and an output. The null processor determines a threshold for interference, identifies which I and Q correlators include interference, and nulls the I and Q correlators that include interference. The n msec pulses may be compared with the power of I, Q, or a combination of I and Q. Not every m msec period (e.g., 20 msec period) includes interference. Based on the comparison of a pulse to the power of I, Q, or a combination of I and Q, the pulse may be nulled or not nulled. The trade-off between nulling a pulse and not nulling a pulse may be predetermined or determined in real time. The pulsed method is conducted on a per data bit basis. It is noted that pulsed interference may also be identified from the output of the FFT processor previously described. An interference pulse may also be identified from an output of an FFT processor.

The correlator summing module 1005 includes an input connected to the output of the null processor 1003, and an output. The correlator summing module 1005 sums the outputs of the null processor 1003. The correlator summing module 1005 may use an I&D method optimized for noise (e.g., a 20 msec I&D method). However, the present disclosure is not limited thereto, and any suitable summing method may be used.

Figure 11:
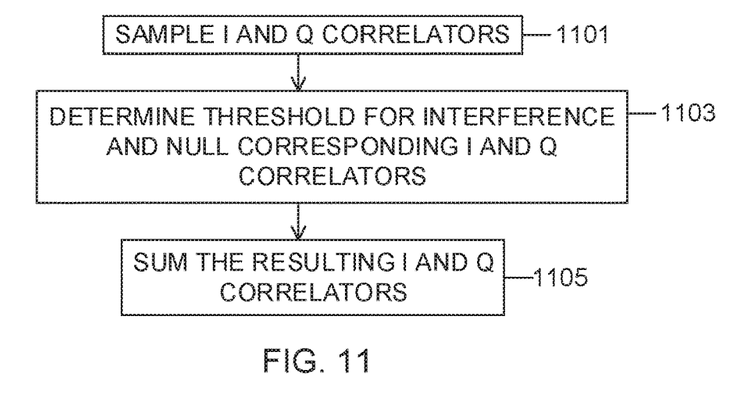
FIG. 11 is a method of the interference mitigation processor of FIG. 10, according to an embodiment of the present disclosure.

FIG. 11 is a method of the interference mitigation processor 101 of FIG. 10, according to an embodiment of the present disclosure, where the interference mitigation processor 101 uses a pulse method. The method includes analyzing n msec pulses (e.g. 1 msec pulses) for excessive energy in any of the n msec I and Q correlators (e.g., 1 msec I and Q correlators).

Referring to FIG. 11, at 1101, the method receives, by a sampling module, coherent correlation summations (e.g., 1 msec I and Q correlators $I_{\Sigma 1\ msec}$, $Q_{\Sigma 1\ msec}$) and a sampling time $T_C$ for sampling, where the sampling time $T_C$ is equal to a pulse width of the received coherent correlators. For example, if the pulse width of the received coherent correlators is 1 msec then $T_C$ is 1 msec.

At 1103, the method determines a threshold for interference, identifies which I and Q correlators include interference, and nulls the I and Q correlators that include interference by a null processor. Then msec pulses may be compared with the power of I, Q, or a combination of I and Q. Not every m msec period (e.g., 20 msec period) includes interference. Based on the comparison of a pulse to the power of I, Q, or a combination of I and Q, the pulse may be nulled or not nulled. The trade-off between nulling a pulse and not nulling a pulse may be predetermined or determined in real time. The pulsed method is conducted on a per data bit basis. It is noted that pulsed interference may also be indicated from the output of the FFT processor previously described. An interference pulse may also be indicated from an output of an FFT processor.

At 1105, the method sums the coherent correlators that have not been nulled by a correlator summing module. The coherent correlators that have not been nulled may be summed using an I&D method optimized for noise (e.g., a 20 msec I&D method). However, the present disclosure is not limited thereto, and any suitable summing method may be used.

Figure 12:
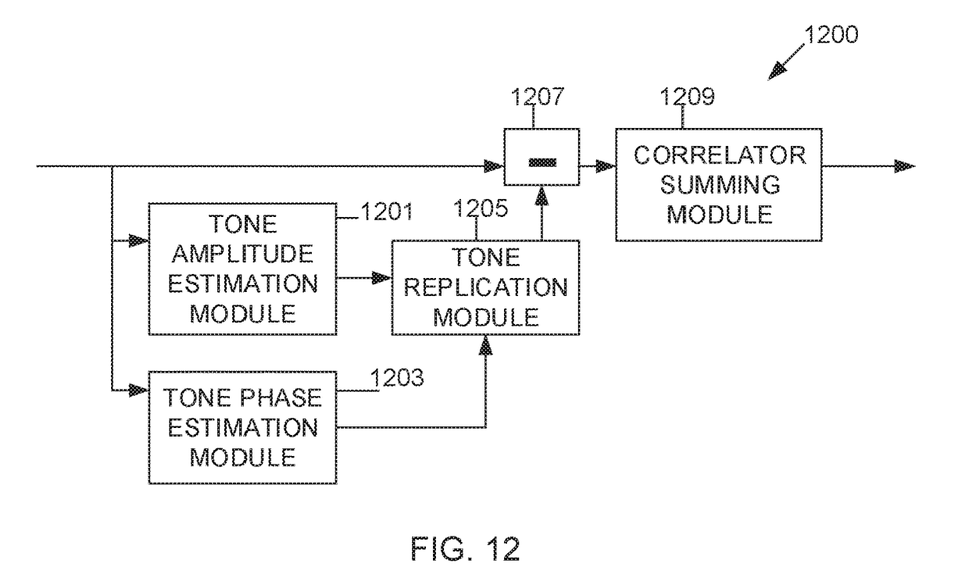
FIG. 12 is a block diagram of a tone canceller, according to an embodiment of the present disclosure.

FIG. 12 is a block diagram of a tone canceller 1200, according to an embodiment of the present disclosure, where a tone is cancelled for post correlation. Multiple tones may be cancelled simultaneously. Tone cancellation may be applied to each narrowband interference. According to one embodiment, the present process (e.g., FFT/IFFT, tone canceling) can further compensate for tones created by a data stream (e.g., a stream of alternating ones and zeros produces a 25 Hz tone). The tone cancellation method may be implemented in hardware or software.

Referring to FIG. 12, the tone canceller 1200 includes a tone amplitude estimation module 1201, a tone phase estimation module 1203, a tone replication module 1205, a subtractor 1207, and a correlator summing module 1209.

The tone amplitude estimation module 1201 includes an input for receiving coherent correlators, and an output. The tone amplitude estimation module estimates the amplitude of a tone in the received coherent correlators.

The tone phase estimation module 1203 includes an input for receiving coherent correlators, and an output. The tone phase estimation module estimates the phase of a tone in the received coherent correlators.

The tone replication module 1205 includes a first input connected to the output of the tone amplitude estimation module 1201 for receiving the tone amplitude estimation, a second input connected to the output of the tone phase estimation module 1203 for receiving the tone phase estimation, and an output. The tone replication module replicates a tone in the received coherent correlators.

The subtractor 1207 includes a first input for receiving the coherent correlators, a second input connected to the output of the tone replication module 1205, and an output. The subtractor 1207 subtracts the replicated tone from the received coherent correlators. For example, any n msec segment greater that the noise spectrum multiplied by K may be set to zero or the average of pulsed bins may be subtracted from the n msec segment.

The correlator summing module 1209 includes an input connected to the output of the subtractor 1207, and an output. The correlator summing module 1209 sums the tone-removed coherent correlators. The correlator summing module 1209 may use an I&D method optimized for noise (e.g., a 20 msec I&D method). However, the present disclosure is not limited thereto, and any suitable summing method may be used.

Figure 13:
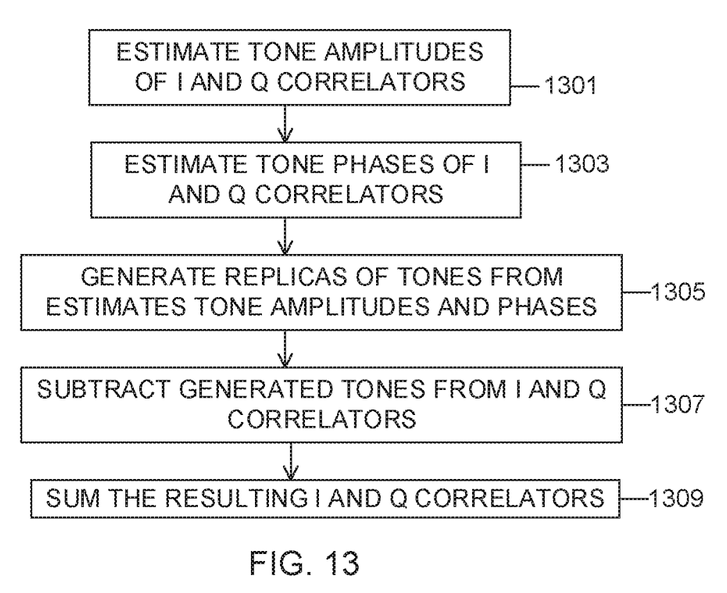
FIG. 13 is a method of the interference mitigation processor of FIG. 12, according to an embodiment of the present disclosure.

FIG. 13 is a method of the interference mitigation processor 101 of FIG. 12, according to an embodiment of the present disclosure.

Referring to FIG. 13, the method estimates an amplitude of a tone in received coherent correlators by a tone amplitude estimation module at 1301.

At 1303, the method estimates a phase of the tone by a tone phase estimation module.

At 1305, the method replicates the tone, by a tone replication module, from the estimated tone amplitude and the estimated tone phase.

At 1307, the method subtracts, by a subtractor, the replicated tone from the received coherent correlators.

At 1309, the method sums the tone-removed coherent correlators by a correlator summing module. The summation may use an I&D method optimized for noise (e.g., a 20 msec I&D method). However, the present disclosure is not limited thereto, and any suitable summing method may be used.

Figure 14:
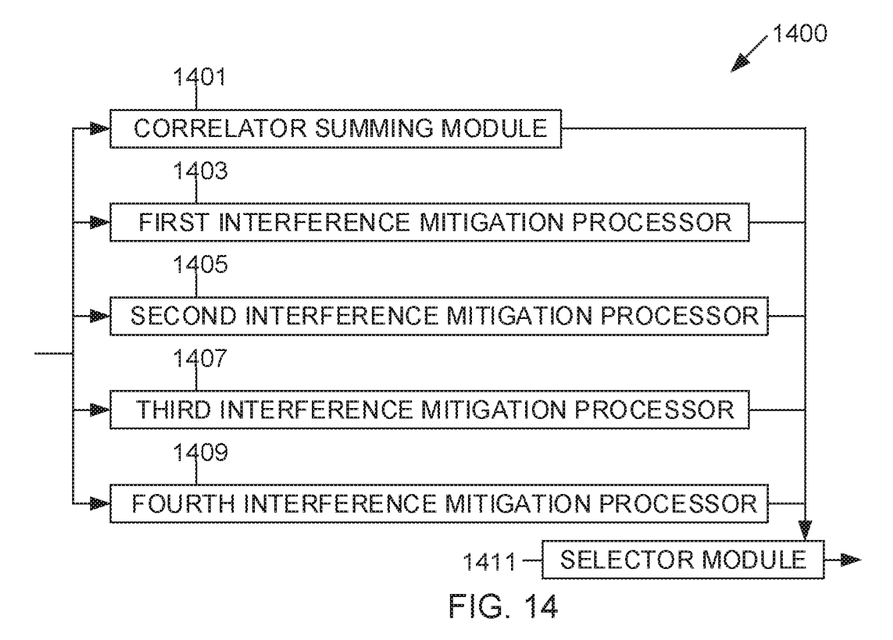
FIG. 14 is a block diagram of an apparatus for selecting between outputs of a correlator summing module and different types of interference mitigation processors, according to an embodiment of the present disclosure.

FIG. 14 is a block diagram of an apparatus 1400 for selecting between outputs of a correlator summing module and different types of interference mitigation processors, according to an embodiment of the present disclosure. According to one embodiment, the apparatus 1400 may execute an I&D operation described above, the filter method described above, the filter with I&D method described above, the FFT/IFFT method described above, and the pulse removal method described above in parallel, and selects the best result.

Referring to FIG. 14, the apparatus 1400 includes a correlator summing module 1401, a first interference mitigation processor 1403 that executes the filter method described above, a second interference mitigation processor 1405 that executes the filter with I&D method described above, a third interference mitigation processor 1407 that executes the FFT/IFFT method described above, a fourth interference mitigation processor 1409 that executes the pulse removal method described above, and a selector module 1411 that selects the best result of the correlator summing module 1401, the first interference mitigation processor 1403, the second interference mitigation processor 1405, the third interference mitigation processor 1407, and the fourth interference mitigation processor 1409.

The correlator summing module 1401 includes an input for receiving coherent correlators, and an output. The correlator summing module 1401 may use an I&D method optimized for noise (e.g., a 20 msec I&D method). However, the present disclosure is not limited thereto, and any suitable summing method may be used.

The first interference mitigation processor 1403 includes an input connected to the input of the correlator summing module 1401 for receiving coherent correlators, and an output. The first interference mitigation processor 1403 may be the first mitigation processor 101 of FIG. 2 described above.

The second interference mitigation processor 1405 includes an input connected to the input of the correlator summing module 1401 for receiving coherent correlators, and an output. The second interference mitigation processor 1405 may be the first mitigation processor 101 of FIG. 4 described above.

The third interference mitigation processor 1407 includes an input connected to the input of the correlator summing module 1401 for receiving coherent correlators, and an output. The third interference mitigation processor 1407 may be the first mitigation processor 101 of FIG. 6 described above.

The fourth interference mitigation processor 1409 includes an input connected to the input of the correlator summing module 1401 for receiving coherent correlators, and an output. The fourth interference mitigation processor 1409 may be the first mitigation processor 101 of FIG. 10 described above.

The selector module 1411 includes an input bus connected to the outputs of the correlator summing module 1401, the first interference mitigation processor 1403, the second interference mitigation processor 1405, the third interference mitigation processor 1407, and the fourth interference mitigation processor 1409, and an output. The selector module 1411 determines the best result of the correlator summing module 1401, the first interference mitigation processor 1403, the second interference mitigation processor 1405, the third interference mitigation processor 1407, and the fourth interference mitigation processor 1409, and outputs the identified best result.

Figure 15:
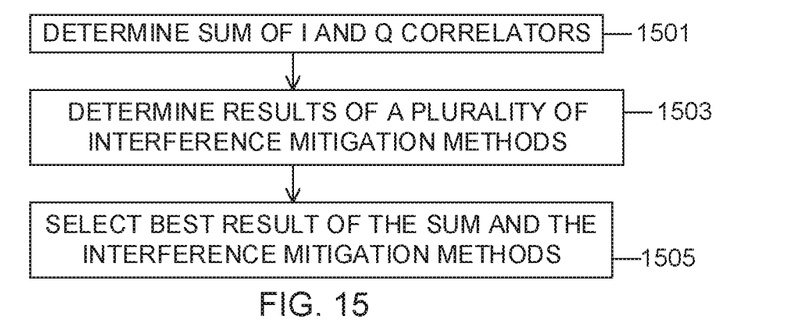
FIG. 15 is a method of the apparatus for selecting between outputs of a correlator summing module and different types of interference mitigation processors of FIG. 14, according to an embodiment of the present disclosure.

FIG. 15 is a method of the apparatus 1400 for selecting between outputs of a correlator summing module and different types of interference mitigation processors, according to an embodiment of the present disclosure. According to one embodiment, the method executes an I&D operation described above, the filter method described above, the filter with I&D method described above, the FFT/IFFT method described above, and the pulse removal method described above in parallel, and selects the best result.

Referring to FIG. 15, the method determines, by a correlator summing module, a sum of coherent correlators at 1501. The summation of coherent correlators may use an I&D method optimized for noise (e.g., a 20 msec I&D method). However, the present disclosure is not limited thereto, and any suitable summing method may be used.

At 1503, the method determines results of a plurality of interference mitigation methods. In one embodiment, the mitigation methods include the first interference mitigation method of FIG. 3 described above, the second interference mitigation method of FIG. 5 described above, the third interference mitigation method of FIG. 7 described above, and the fourth interference mitigation method of FIG. 11 described above, by a first interference mitigation processor, a second interference mitigation processor, a third interference mitigation processor, and a fourth interference mitigation processor, respectively.

At 1505, the method determines the best result, by a selector module, of the correlator summation method described above, the filter method described above, the filter with summation method described above, the FFT/IFFT method described above, and the pulse removal method described above, and outputs the identified best result.

Figure 16:
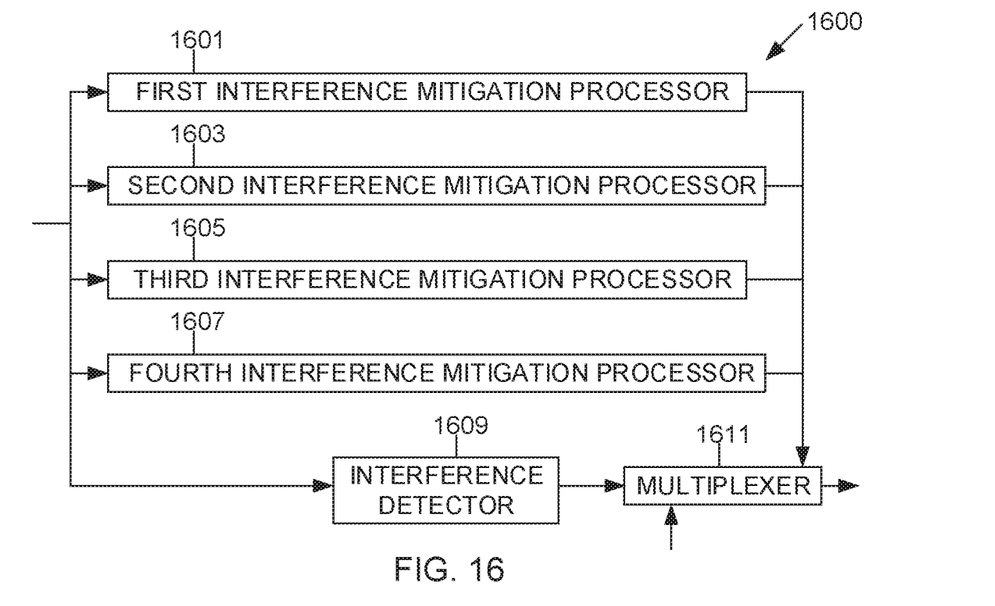
FIG. 16 is a block diagram of an apparatus for multiplexing different types of interference mitigation processors, according to an embodiment of the present disclosure.

FIG. 16 is a block diagram of an apparatus 1600 for multiplexing different types of interference mitigation processors, according to an embodiment of the present disclosure.

In one embodiment, the apparatus 1600 using one of the filter methods described above, the filter with I&D method described above, the FFT/IFFT method described above, and the pulse removal method described above based on detecting interference and/or receiving a metric. For example, interference may be detected based on an observation of an FFT output, a generally inadequate data decode, or an indication internal to, or external from, a GNSS receiver.

Referring to FIG. 16, the apparatus 1600 includes a first interference mitigation processor 1601 that executes the filter method described above, a second interference mitigation processor 1603 that executes the filter with I&D method described above, a third interference mitigation processor 1605 that executes the FFT/IFFT method described above, a fourth interference mitigation processor 1607 that executes the pulse removal method described above, an interference detector 1609, and a multiplexer 1611 that determines which of the first interference mitigation processor 1601, the second interference mitigation processor 1603, the third interference mitigation processor 1605, and the fourth interference mitigation processor 1607 to use based on detected interference and/or a received metric.

The first interference mitigation processor 1601 includes an input for receiving coherent correlators, and an output. The correlator summation module 1401 may use an I&D method optimized for noise (e.g., a 20 msec I&D method). However, the present disclosure is not limited thereto, and any suitable summing method may be used. The first interference mitigation processor 1601 may be the first mitigation processor 101 of FIG. 2 described above.

The second interference mitigation processor 1603 includes an input connected to the input of the first interference mitigation processor 1601 for receiving coherent correlators, and an output. The second interference mitigation processor 1603 may be the first mitigation processor 101 of FIG. 4 described above.

The third interference mitigation processor 1605 includes an input connected to the input of the first interference mitigation processor 1601 for receiving coherent correlators, and an output. The third interference mitigation processor 1605 may be the first mitigation processor 101 of FIG. 6 described above.

The fourth interference mitigation processor 1607 includes an input connected to the input of the first interference mitigation processor 1601 for receiving coherent correlators, and an output. The fourth interference mitigation processor 1607 may be the first mitigation processor 101 of FIG. 10 described above.

The interference detector 1609 includes an input connected to an input of the first interference mitigation processor 1601, and an output. The interference detector 1609 detects interference by one of the interference detection methods described above or any other suitable interference detection method.

The multiplexer 1611 includes an input bus connected to the outputs of the first interference mitigation processor 1601, the second interference mitigation processor 1603, the third interference mitigation processor 1605, and the fourth interference mitigation processor 1607, a first input connected to the output of the interference detector 1609, a second input for receiving a metric, and an output. The multiplexer 1611 determines which of the first interference mitigation processor 1601, the second interference mitigation processor 1603, the third interference mitigation processor 1605, and the fourth interference mitigation processor 1607 to use, based on interference in the coherent correlators and/or a received metric.

Figure 17:
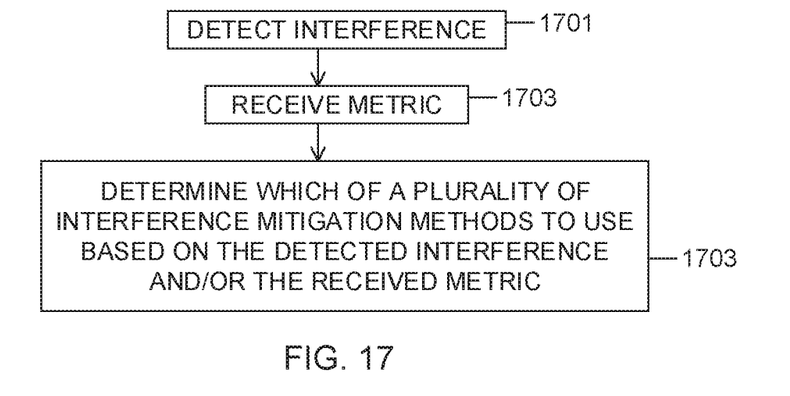
FIG. 17 is a method of the apparatus for multiplexing different types of interference mitigation processors of FIG. 16, according to an embodiment of the present disclosure.

FIG. 17 is a method of the apparatus 1600 for multiplexing different types of interference mitigation processors of FIG. 16, according to an embodiment of the present disclosure. According to one embodiment, the method executes an I&D operation described above, the filter method described above, the filter with I&D method described above, the FFT/IFFT method described above, and the pulse removal method described above in parallel, and selects the best result.

Referring to FIG. 17, the method detects interference, by an interference detector, at 1701. The interference detector detects interference by one of the interference detection methods described above or any other suitable interference detection method.

At 1703, the method receives a metric by a multiplexer. One metric for selecting which method to use is to use two or more of the filter method, the filter with I&D method, the FFT/IFFT method, and the pulse removal method in parallel, observing the performance of each method, and then continuing to use the best performing methods and ceasing to use the worst performing methods. For example, if a filter method is initiated along with an FFT/IFFT and pulsed interference method, then if the FFT finds the interferer is a CW tone inband (e.g., 15 Hz) is effectively nulled (based on before and after BER, for example, or before and after mitigation CNO improving), then other mitigation methods may be turned off. Alternatively the methods may be initiated in sequence, for example, the FFT/IFFT method is implemented first. If the FFT/IFFT method does not provide a desired result, then a subsequent method (e.g., the pulsed interference method) may be initiated to evaluate if the subsequent method provides the desired result.

At 1705, the method determines which of a first interference mitigation processor, a second interference mitigation processor, a third interference mitigation processor, and a fourth interference mitigation processor to use, based on the detected interference and/or received metric. The first interference mitigation processor may be the first interference mitigation processor 1601 of FIG. 16 described above. The second interference mitigation processor may be the second interference mitigation processor 1603 of FIG. 16 described above. The third interference mitigation processor may be the third interference mitigation processor 1605 of FIG. 16 described above. The fourth interference mitigation processor may be the fourth interference mitigation processor 1607 of FIG. 16 described above.

Figure 18:
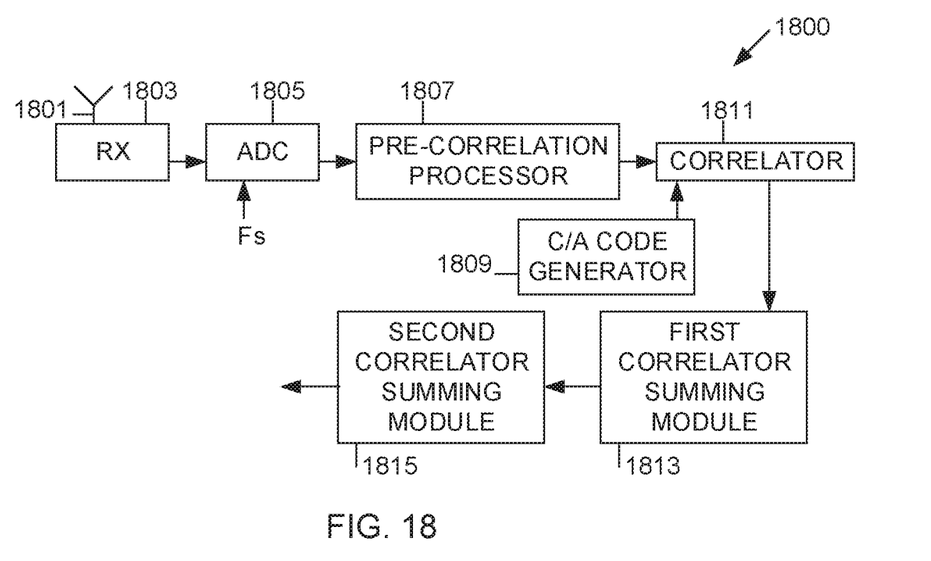
FIG. 18 is an apparatus for a GNSS.

FIG. 18 is an apparatus 1800 for a global navigation satellite system (GNSS).

FIG. 18 illustrates an exemplary block diagram of a GNSS receiver, according to one embodiment. The GNSS receiver includes an I&D operation that processes 1 msec I and Q correlations into 20 msec I and Q correlations.

Referring to FIG. 18, the GNSS receiver 1800 includes an antenna 1801, a receiver 1803, an analog-to-digital converter (ADC) 1805, a pre-correlation processor 1807, a C/A code generator 1809, a correlator 1811, a first correlator summing module 1813, and a second correlator summing module 1815.

The receiver (RX) 1803 includes an input connected to the antenna 1801, and an output.

The ADC 1805 includes a first input connected to the output of the receiver 1803, a second input for receiving a sampling frequency Fs, and an output.

The pre-correlation processor 1807 includes an input connected to the output of the ADC 1805, and an output.

The C/A code generator 1809 includes an output.

The correlator 1811 includes a first input connected to the output of the pre-correlation processor 1807, a second input connected to the output of the C/A code generator 1809, and an output.

The first correlator summing module 1813 includes an input connected to the output of the correlator 1811, and an output.

The second correlator summing module includes an input connected to the output of the first correlator summing module 1813, and an output.

Figure 19:
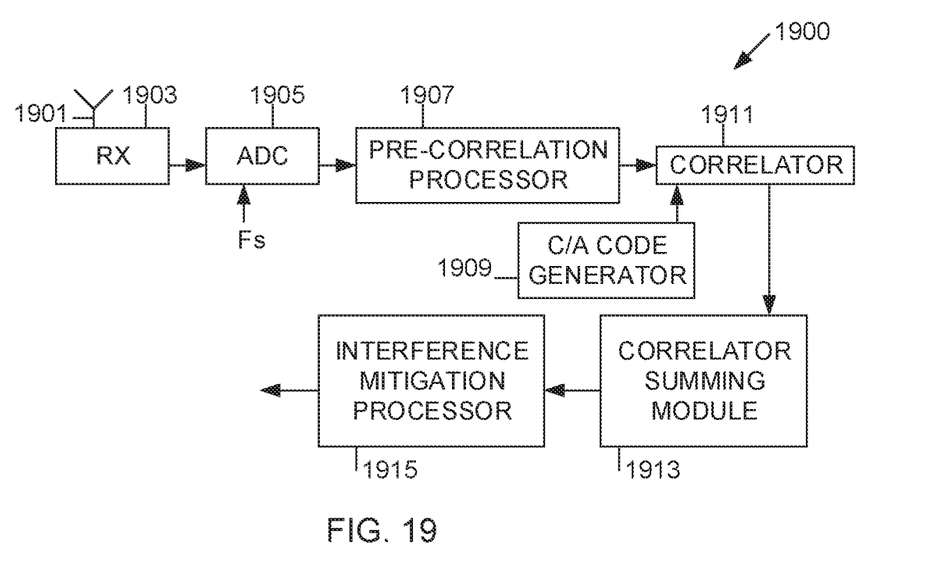
FIG. 19 is an apparatus for a GNSS, according to an embodiment of the present disclosure.

FIG. 19 is a block diagram of a GNSS receiver 1900, according to an embodiment of the present disclosure.

Referring to FIG. 19, the GNSS receiver 1900 includes an antenna 1901, a receiver 1903, an ADC 1905, a pre-correlation processor 1907, a C/A code generator 1909, a correlator 1911, a correlator summing module 1913, and an interference mitigation processor 1915.

The receiver (RX) 1903 includes an input connected to the antenna 1901, and an output.

The ADC 1905 includes a first input connected to the output of the receiver 1903, a second input for receiving a sampling frequency Fs, and an output.

The pre-correlation processor 1907 includes an input connected to the output of the ADC 1905, and an output.

The C/A code generator 1909 includes an output.

The correlator 1911 includes a first input connected to the output of the pre-correlation processor 1907, a second input connected to the output of the C/A code generator 1909, and an output.

The correlator summing module 1913 includes an input connected to the output of the correlator 1911, and an output.

The interference mitigation processor 1915 includes an input connected to the output of the correlator summing module 1913, and an output. The interference mitigation processor 1915 receives $I_{\Sigma 1\ msec}$, $Q_{\Sigma 1\ msec}$ correlators, outputs $I_{\Sigma 20\ msec}$, $Q_{\Sigma 20\ msec}$ correlators, provides more than I&D processing, and analyzes 1 msec correlations for different types of interference, including CW interference, non-CW wider bandwidth interference, and pulsed jammers.

The present disclosure may be applied to on-frequency and frequency bin offset satellite signals. The present disclosure may further be applied to acquisition/verify stages of a receiver.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
    an interference mitigation processor, including an input, and an output, the interference mitigation processor configured to sum n msec received correlators over m msec, and analyze the n msec correlators to reduce interference;
    a filter configured to receive the n msec correlators;
    a delay module connected to the filter and configured to delay an output of the filter; and
    a decimator connected to the delay module and configured to decimate an output of the delay module so as to produce coherent correlators optimized for noise by aligning the output with an m sec data bit.

2. The apparatus of claim 1, wherein the filter is further configured to receive a sampling time.

3. The apparatus of claim 1, wherein the filter is a finite impulse response (FIR) filter or an infinite impulse response (IIR) filter.

4. The apparatus of claim 1, wherein the delay module is configured to delay the output of the filter by m msec.

5. The apparatus of claim 4, wherein m is half of a length of the filter.

6. The apparatus of claim 1, wherein the decimator is further configured to generate correlators over m msec by selecting one of every m outputs of the delay module.

7. The apparatus of claim 6, wherein the generated correlators have a delay of about half of a length of the filter.

8. The apparatus of claim 1, further comprising a correlator summing module configured to generate correlators of m msec by summing outputs of the delay module.

9. A method comprising,
    summing, by an interference mitigation processor, n msec received correlators over m msec; and
    analyzing, by the interference mitigation processor, the n msec correlators to reduce interference;
    wherein the summing and analyzing includes:
        filtering, by a filter, the received n msec correlators;
        delaying, by a delay module, the filtered n msec correlators; and
        decimating, by a decimator, an output of the delay module so as to produce coherent correlators optimized for noise by aligning the output with an m sec data bit.

10. The method of claim 9, wherein the filter is configured to receive a sampling time.

11. The method of claim 9, wherein the filter is a finite impulse response (FIR) filter or an infinite impulse response (IIR) filter.

12. The method of claim 9, wherein delaying the filtered n msec correlators comprises delaying the filtered n msec correlators by m msec.

13. The method of claim 12, wherein m is half of a length of the filter.

14. The method of claim 9, wherein decimating the output of the delay module further comprises generating correlators over m msec by selecting one of every m outputs of the delay module.

15. The method of claim 14, wherein the generated correlators have a delay of about half of a length of the filter.

16. The method of claim 9, wherein the summing and analyzing further comprises summing, by a correlator summing module, the delayed n msec correlators to generate correlators over m msec.

* * * * *